United States Patent [19]

Ono et al.

[11] 4,131,299
[45] Dec. 26, 1978

[54] GAS GENERATOR FOR INFLATABLE VEHICLE COLLISION BAG

[75] Inventors: Koichi Ono; Toshiyuki Takahara, both of Tatsuno; Tetsuyoshi Ito, Himeji, all of Japan

[73] Assignee: Daicel Ltd., Sakai, Japan

[21] Appl. No.: 784,880

[22] Filed: Apr. 5, 1977

[30] Foreign Application Priority Data

Apr. 5, 1976 [JP] Japan .................................. 51-38041

[51] Int. Cl.² .............................................. B60R 21/08
[52] U.S. Cl. ...................................... 280/736; 102/39; 280/741; 428/553
[58] Field of Search ............... 280/731, 736, 737, 740, 280/741, 742; 428/549, 550, 553; 102/39

[56] References Cited

U.S. PATENT DOCUMENTS

| | | | |
|---|---|---|---|
| 2,631,957 | 3/1953 | Francis | 156/178 X |
| 2,979,400 | 4/1961 | Mouwen | 428/553 X |
| 3,843,151 | 10/1974 | Lewis | 280/741 X |
| 3,877,882 | 4/1975 | Lette | 280/741 X |
| 3,904,221 | 9/1975 | Shiki | 102/39 X |
| 3,944,251 | 3/1976 | Lynch | 280/731 |
| 3,985,076 | 10/1976 | Schneiter | 280/741 X |
| 3,986,456 | 10/1976 | Doin | 102/39 |
| 4,021,275 | 5/1977 | Kishi | 280/741 |
| 4,049,904 | 9/1977 | Hori | 428/215 X |

*Primary Examiner*—John P. Silverstrim
*Attorney, Agent, or Firm*—Sughrue, Rothwell, Mion, Zinn and Macpeak

[57] ABSTRACT

A gas generator for an inflatable vehicle safety bag comprises three concentric chambers defined between a diffuser cup and a centrally recessed base member adapted to fit over a steering wheel hub, including an inner chamber for holding an electric ignition squib, an intermediate chamber for holding a canister of gas generating agent, and an outer chamber filled with stacked and coiled wire mesh, and a sintered metallic fiber body. The squib flashes through openings in the inner chamber to ignite the gas generating agent, and the gas produced thereby (primarily $N_2$) passes through openings in a partition ring, obliquely through the wire mesh where the heat and chemical residues from the reaction are absorbed, and out openings in the diffuser cup through the sintered fiber filter. A diverter ring in the outer chamber serves to channel the gas flow obliquely or diagonally through the wire mesh.

6 Claims, 1 Drawing Figure

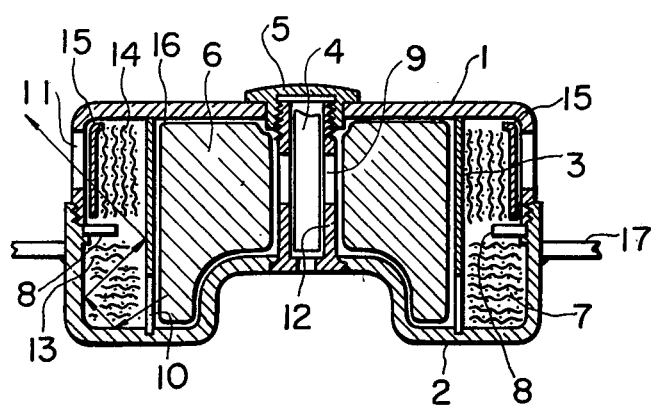

GAS GENERATOR FOR INFLATABLE VEHICLE COLLISION BAG

BACKGROUND OF THE INVENTION

This invention relates to a gas generator for a vehicle safety bag mounted in front of the driver seat and inflatable upon impact or collision.

A variety of gas generators have been developed for vehicle safety bags, but they are generally inadequate for small automobiles wherein any initial impact is followed by a secondary collision between the driver and the steering wheel or dashboard within an extremely short period of time, as compared with a larger vehicle. Thus, the gas generator in a small automobile must be light and compact, and capable of fully inflating a gas bag in approximately 20 ms. after initiation. The prior art gas generators fail to meet these criteria.

SUMMARY OF THE INVENTION

The gas generator according to the present invention meets the above requirements by providing three concentric chambers between a diffuser cup and a centrally recessed base member adapted to fit over a steering wheel hub, including an inner chamber for holding an electric ignition squib, an intermediate chamber for holding a canister of gas generating agent, and an outer chamber filled with stacked and coiled wire mesh, and a sintered metallic fiber body. The squib flashes through openings in the inner chamber to ignite the gas generating agent, and the gas produced thereby (primarily $N_2$) passes through openings in a partition plate, obliquely through the wire mesh where the heat and chemical residues from the reaction are absorbed, and out openings in the diffuser cup through the sintered fiber filter. A diverter ring in the outer chamber serves to channel the gas flow obliquely or diagonally through the wire mesh.

BRIEF DESCRIPTION OF THE DRAWING

The single drawing FIGURE shows a longitudinal cross sectional view of a gas generator according to the present invention.

DETAILED DESCRIPTION OF THE PREFERRED EMBODIMENT

Referring now to the accompanying drawing, the light and compact gas generator of the present invention comprises a diffuser cup 1 and a base member 2 having a raised recess in the central portion thereof connected together at their peripheral edges by a threaded screw coupling or the like. A squib holder 12 is disposed in the central portion intermediate the cup and base member, and a partition or separation ring 3 is disposed in the radial mid-portion between the cup and base, whereby three concentric chambers are defined, as shown in the drawing. The central chamber defined by the squib holder 12 serves to mount or contain an ignition squib 4, the intermediate chamber defined between the squib holder 12 and the partition ring 3 serves to contain a gas generating chemical agent 6, while the outer chamber 7 defined between the ring 3 and the flanges of the cup and base member accommodates a heat absorbing and filtering material. A ring 8 for diverting the direction of gas flow within the outer chamber is disposed on and extends inwardly from the vertical mid-portion of the coupling between the cup and base member. The squib holder 12 has a plurality of openings 9 in the vicinity of the vertical mid-portion thereof, and the partition ring 3 also has a plurality of openings 10 in its lower portion. The diffuser cup 1 has a plurality of gas outlet openings 11 in the vicinity of its flange shoulder. A closure cap 5 screws onto the top end of the squib holder 12. The holder 12 and partition ring 3 enhance the structural rigidity of the gas generator, which enables a reduction in the wall thickness of the diffuser cup 1 and the base member 2, whereby a light and compact generator construction is obtained.

The central recess in the bottom portion of the base member 2 provides space to accomodate a steering wheel fastening nut when the gas generator is mounted over the hub of a vehicle steering wheel. The gas generating agent may be sealingly disposed in a cartridge or canister 16 made of metal foil, plastic film, or a composite thereof, and then installed in the intermediate chamber. The metal foil may have one surface coated with a thermoplastic synthetic resin. The electric squib 4 is mounted in the squib holder 12 after the other components have all been assembled, thus ensuring safety during assembly.

In order to meet the requirement of rapid gas generation, whereby the time from generator ignition to full gas bag inflation must be on the order of 20 ms., it is essential to minimize the gas flow resistance within the generator. Studies on the physical and chemical characteristics of various types of heat absorbing and filtering materials have indicated that optimum performance may be achieved by using a combination of wire gauze and a sintered metallic fiber. Wire gauze has a high heat absorption capacity, is inexpensive, and has a high residual gas collecting effect with an oblique gas flow direction. That is, if gas streams pass through the wire gauze in a perpendicular direction, poor heat absorption and gas collection results.

Thus, wire gauze is installed in the outer chamber 7 in the manner shown in the drawing, wherein a plurality of annular sheets of wire gauze 13 are superposed or stacked on one another in the lower half of the chamber, while in the upper half thereof strips of wire gauze 14 are wound in the form of a coil. The laminar body of wire gauze 13 in the lower half of the chamber 7 need not be annular in shape, but it is necessary that there be no substantial gaps between the adjacent sheets of wire gauze. Thus, the wire gauze 13 may also have a coiled from. The coiled form has no substantial advantage in function or effect over the annular form, but is somewhat cheaper and easier to manufacture. The streams of gas produced in the generating chamber repeatedly impinge against the walls of the generator, and are diverted or reflected therefrom as generally shown by the arrows on the left side of the drawing. Thus, in its travel through the openings 10 towards the outlet openings 11, the gas streams pass through the wire gauze 13, 14 in an oblique or diagonal direction, whereby chemical residues entrained in the gas adhere to and are collected on the meshes of the wire gauze. The ring 8 serves to divert the direction of the gas streams and prevents them from passing through the wire gauze in a parallel or perpendicular fashion, thereby assuring the best or optimum utilization of the gauze.

After heat absorption and filtration by the wire gauze, during which most of the chemical residues are collected, the gas streams pass through the sintered metallic fiber body 15 disposed internally of and in close proximity to the outlet openings 11, whereby any remaining residues of super-fine particles are filtered out by the sintered body. The gases exiting through the openings 11 into the gas bag (not shown) have a sufficiently high pressure to rapidly inflate the bag, but their temperature has been reduced to a level at which they do not damage or burn the bag. The gases are thus extremely clean and harmless to the human body, even if they escape. It takes only a short period of time for the generated gas to pass through the heat absorbing and filtering chamber 7 because the wire gauze has an extremely low flow resistance and the sintered metallic fiber body has a gas permeability of about 90%. These factors enable the period of time from gas generation to full bag inflation to be reduced to the order of 20 ms.

The sintered body 15 preferably consists of two sheets obtained by placing stainless steel fibers having a mean diameter of $8\mu$ on one surface of a sheet of 20 mesh stainless steel wire gauze at a density of 750 grs/m$^2$, and then subjecting same to sintering.

A gas generating agent 6 suitable for use with the present invention essentially comprises sodium azide reacted with an oxide, such as potassium perchlorate, thereby producing an innocuous gas primarily containing nitrogen.

The composition of the agent mixture and the process for producing it are disclosed in U.S. Pat. No. 4,021,275 (Japanese Patent Application Serial No. 52194/1974) filed by the assignee of the present invention. Typical gas generating agent examples are mixtures containing one or more of an alkali metal azide or an alkaline earth metal azide, fine particles of silicon dioxide, and fine particles of glass.

The proper selection of a gas producing agent from among the above examples enables rapid combustion at a low pressure, with the resultant production of innocuous gases for quickly inflating a safety bag.

Specific examples are presented below.

EXAMPLE 1

A test was carried out using the gas generator shown in the drawing and 78g of a gas generating agent. The openings 10 comprised 20 equi-spaced slits each having a size of 10mm × 5mm disposed around the lower peripheral surface of the partition ring 3. The laminar wire gauze body 13 consisted of 15 annular sheets of 14 mesh stainless steel wire gauze, while the laminar body 14 was coiled wire gauze 24mm in width × 200mm in length. The sintered metallic body 15 was obtained by placing stainless steel fibers having a mean diameter of $8\mu$ on one side surface of a sheet of 20 mesh stainless steel wire gauze at a density of 750g per square meter, and subjecting same to spray-sintering. The body 15 comprised two plys of such material.

A 50 l bag having a single outlet vent of about 40mm diameter was completely inflated with the generator described above in 23 ms. The maximum internal pressure within the bag was 0.19 kg/cm$^2$, and the maximum pressure within the gas producing chamber 7 was 80kg/cm$^2$. The quantity of sodium residue contained in the gas injected into the bag was 0.1g. The size of the gas generator was 98.4mm in outside diameter and 50mm in overall height, and the weight thereof, excluding the mounting flange 17, was about 1 kg.

EXAMPLE 2

A test was carried out using the same gas generator as in Example 1, with 15 annular sheets of 14 mesh stainless steel wire gauze superposed one upon another in place of the coiled wire gauze body 14 as shown in the drawing. Substantially the same performance as in Example 1 was obtained, which proves that the wire gauze bodies 13 and 14 may take any form, such as a coil or an annular stack, with no substantial difference in performance.

EXAMPLE 3

A test was carried out using a gas generator similar to that used in Example 1, and employing 82g of gas generating agent. The openings 10 were provided by drilling 16 holes of 10mm diameter in equi-spaced relation to one another around the peripheral surface of the partition ring 3, with the other conditions and the bag size similar to those in Example 1. The complete bag inflation time was 18 ms., the maximum pressure within the bag was 0.26kg/cm$^2$, and the maximum pressure within the gas producing chamber was 70kg/cm$^2$. The amount of sodium residue contained in the gas injected into the bag was 0.05g.

What is claimed is:

1. A gas generator for an inflatable vehicle safety bag, comprising:
   a) a cylindrical, skirted diffuser cap having a plurality of gas outlet openings spaced around its skirt,
   b) a cylindrical, skirted base member having a central recess therein and engageable with the cup skirt to define therewith a generator housing,
   c) a hollow cylindrical squib holder centrally and axially disposed between the cup and base member and having a plurality of spaced openings around its periphery,
   d) a partition ring axially disposed between the cup and base member in a concentric manner with respect to the squib holder and the engaged skirts, to thereby define a first hollow cylindrical chamber between the ring and the holder and a second hollow cylindrical chamber between the skirts and the ring, and having a plurality of spaced openings in its lower periphery proximate the base member,
   e) an annular diverter ring disposed on the inner periphery of the engaged skirts proximate the midpoint thereof and extending inwardly in the second chamber toward the partition ring but terminating short thereof,
   f) first and second laminar wire gauze bodies disposed in and substantially filling the second chamber below and above the diverter ring, respectively, said first and second laminar wire gauze bodies being disposed substantially perpendicular to one another and further being disposed with respect to the spaced openings in said diffuser cup and the spaced openings in said partition ring so that gas passing through said second chamber passes through said first and second laminar wire gauze bodies at oblique angles,
   g) sintered metallic fiber ring disposed in the second chamber above the diverter ring and between the second wire gauze body and the openings in the diffuser cup skirt, said sintered metallic fiber comprising stainless steel fibers sintered to a sheet of stainless steel wire gauze,
   h) an electric ignition squib disposed in the squib holder, and
   i) a gas generating chemical agent disposed in the first chamber.

2. A gas generator as defined in claim 1, wherein at least one of the laminar wire gauze bodies comprises a stack of flat annular wire gauze rings.

3. A gas generator as defined in claim 1, wherein the gas generating agent is wrapped in a metal foil having at least one surface thereof coated with thermoplastic synthetic resin.

4. A gas generator as defined in claim 1, wherein at least one of the laminar wire gauze bodies comprises strips of wire gauze wound in the form of a coil.

5. A gas generator as defined in claim 1, wherein the sintered metallic ring comprises two sheets each obtained by placing stainless steel fibers having a mean diameter of $8\mu$ on one surface of a sheet of stainless steel wire gauze at a density of $750 g/m^2$, and subjecting same to sintering.

6. A gas generator as defined in claim 1, further comprising a cap member for engaging the diffuser cup and closing one end of the squib holder, whereby the closed squib holder enhances the structural support and axial expansional rigidity of the generator housing.

* * * * *